(12) United States Patent
Mackin et al.

(10) Patent No.: US 9,234,707 B2
(45) Date of Patent: Jan. 12, 2016

(54) HEAT EXCHANGER SYSTEMS AND METHODS FOR CONTROLLING AIRFLOW COOLING

(71) Applicant: The Boeing Company, Chicago, IL (US)

(72) Inventors: Steve G. Mackin, Bellevue, WA (US); Eric Landre, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 270 days.

(21) Appl. No.: 13/624,612

(22) Filed: Sep. 21, 2012

(65) Prior Publication Data
US 2014/0083106 A1 Mar. 27, 2014

(51) Int. Cl.
| | | |
|---|---|---|
| F28D 9/00 | (2006.01) | |
| F28F 3/02 | (2006.01) | |
| B64D 13/08 | (2006.01) | |
| B64D 13/06 | (2006.01) | |
| B64D 13/02 | (2006.01) | |
| F02C 6/08 | (2006.01) | |
| B64D 13/00 | (2006.01) | |
| F28D 21/00 | (2006.01) | |

(52) U.S. Cl.
CPC ............... *F28D 9/0062* (2013.01); *B64D 13/02* (2013.01); *B64D 13/08* (2013.01); *F28F 3/025* (2013.01); *B64D 13/00* (2013.01); *B64D 2013/0603* (2013.01); *F02C 6/08* (2013.01); *F28D 2021/0021* (2013.01); *F28F 2250/06* (2013.01)

(58) Field of Classification Search
CPC .............. F02C 7/12; F02C 7/143; F02C 7/18; B64D 13/00; B64D 13/06; B64D 13/08; B64D 2013/0603; B64D 13/02; B60H 1/00; F28D 9/00; F28D 2021/0021; F28D 2021/0082; F28D 9/0062; F28F 27/02; F28F 2250/06
USPC ............................ 60/266, 785, 728; 165/103
See application file for complete search history.

(56) References Cited

U.S. PATENT DOCUMENTS

| | | | | |
|---|---|---|---|---|
| 2,909,323 A | * | 10/1959 | Cholvin ................ | B64D 13/06 165/279 |
| 3,878,692 A | * | 4/1975 | Steves .................... | B64D 13/06 62/172 |
| 4,209,993 A | * | 7/1980 | Rannenberg ............ | B60H 1/32 62/239 |
| 4,263,786 A | * | 4/1981 | Eng ........................ | B64D 13/06 62/172 |
| 5,012,646 A | * | 5/1991 | Speer ............................. | 60/728 |
| 6,302,191 B1 | * | 10/2001 | Wickham ................ | F28D 7/005 165/103 |
| 7,198,037 B2 | * | 4/2007 | Sayers et al. ............. | 123/568.12 |
| 7,380,749 B2 | | 6/2008 | Fucke et al. | |
| 7,434,765 B2 | | 10/2008 | Zielinski et al. | |
| 7,810,552 B2 | | 10/2010 | Slaughter | |
| 7,871,038 B2 | | 1/2011 | Space et al. | |

(Continued)

*Primary Examiner* — Phutthiwat Wongwian
*Assistant Examiner* — Alain Chau
(74) *Attorney, Agent, or Firm* — Joseph M. Butscher; The Small Patent Law Group LLC

(57) ABSTRACT

Heat exchanger systems and methods for controlling airflow cooling are provided. One system includes a bypass pre-cooler having a housing, an inlet configured to receive core engine airflow into the housing from one or more aircraft ducts, a heat exchanger within the housing and a bypass section within the housing having an airflow path separate from the heat exchanger. The bypass pre-cooler also includes a valve coupled to the inlet and configured to switch airflow between the heat exchanger and the bypass section and an outlet coupled to the heat exchanger and the bypass section.

18 Claims, 14 Drawing Sheets

(56) References Cited

U.S. PATENT DOCUMENTS

| | | | |
|---|---|---|---|
| 8,033,118 B2 * | 10/2011 | Monteiro | F02C 6/08 60/782 |
| 2010/0243220 A1 * | 9/2010 | Geskes et al. | 165/133 |
| 2010/0263831 A1 * | 10/2010 | Kaspersen | F22B 1/1807 165/96 |
| 2011/0180234 A1 * | 7/2011 | Wickham | 165/100 |
| 2012/0216545 A1 * | 8/2012 | Sennoun et al. | 60/772 |

* cited by examiner

HEAT EXCHANGER SYSTEMS AND METHODS FOR CONTROLLING AIRFLOW COOLING

BACKGROUND

The present disclosure relates generally to heat exchanger systems, such as heat exchanger systems for aircraft.

Heat exchangers are devices that transfer heat from one fluid to another and may be used in refrigeration, air conditioning, space heating, electricity generation and chemical processing. For example, heat exchangers may be used in the aerospace and automobile industries.

In aircraft applications, Federal Aviation Regulations (FAR) from the Federal Aviation Administration (FAA) set standards for different aircraft operating conditions. For example, FAR airworthiness standards exist for transport category airplanes relating to fresh air requirements. In order to meet these different FAR standards, modifications or changes to different systems or components may be needed. As one example, in order to meet passenger fresh air requirements with existing aircraft cooling packs that include heat exchangers, the engine bleed system needs to deliver higher pressure bleed air than under normal operating pressure conditions. During the cruise phase of a flight, the thrust required by the aircraft slowly decreases as the weight of the vehicle decreases. Bleed air pressure also decreases with the decreasing engine thrust. As a result, bleed air temperature also decreases, which results in the air cooling a heat exchanger to shut off.

At some point during the cruise, the engine bleed system switches the bleed port to a higher stage of the engine high pressure compressor to meet the cooling pack requirement. When the bleed system switches to a higher stage of air cooling, the heat exchanger is increased to a maximum operating level, with the energy extracted from the engine greatly increased, thus, resulting in a negative impact on the specific fuel consumption (SFC) of the engine. Accordingly, fuel burn during flight is increased.

Known systems to meet the cooling pack pressure requirements on the low stage bleed during cruise include engine re-designs. However, this re-design to utilize lower air pressure adversely affects other flight phases and is costly both in design and certification.

SUMMARY

In accordance with one embodiment, a bypass pre-cooler is provided that includes a housing, an inlet configured to receive core engine airflow into the housing from one or more aircraft ducts, a heat exchanger within the housing and a bypass section within the housing having an airflow path separate from the heat exchanger. The bypass pre-cooler also includes a valve coupled to the inlet and configured to switch airflow between the heat exchanger and the bypass section and an outlet coupled to the heat exchanger and the bypass section.

In accordance with another embodiment, an aircraft engine is provided that includes a first duct extending from a low pressure section of a core engine flow and a second duct extending from a high pressure section of the core engine flow. The aircraft engine also includes a bypass pre-cooler having an inlet coupled to the first and second ducts, wherein the bypass pre-cooler has a valve coupled to the inlet, with the valve switchably coupling the inlet to a heat exchanger and a bypass section within the bypass pre-cooler.

In accordance with another embodiment, a method of pressurizing an aircraft cabin is provided. The method includes operating an aircraft engine, ducting bleed air from the aircraft engine at a high pressure stage and a low pressure stage of the engine and ducting the bleed air to a bypass pre-cooler. The method also includes controlling a valve of the bypass pre-cooler based on a monitored air pressure downstream of the bypass pre-cooler to duct the bleed air through a heat exchanger or a bypass section of the bypass pre-cooler.

The features, functions, and advantages that have been discussed can be achieved independently in various embodiments or may be combined in yet other embodiments, further details of which can be seen with reference to the following description and drawings.

DETAILED DESCRIPTION

Figure 1:
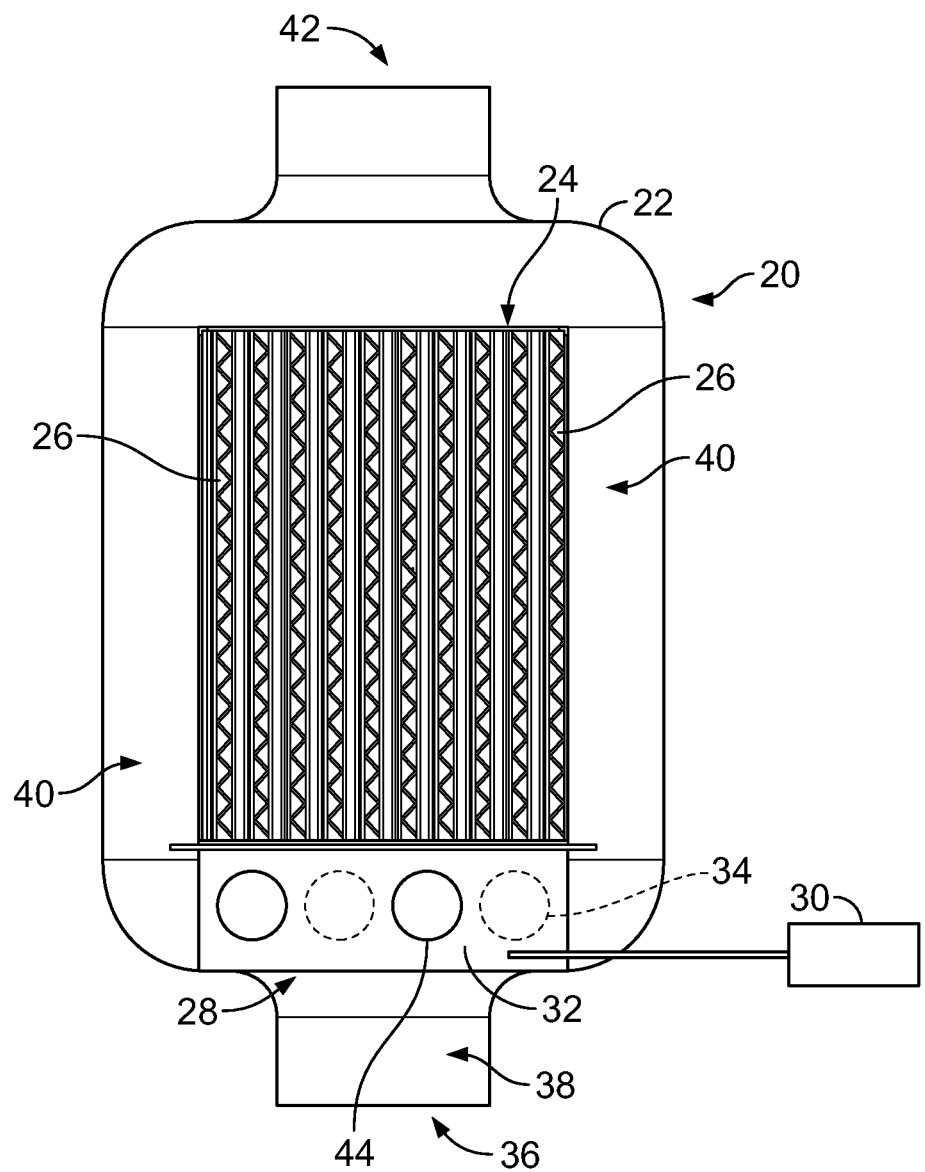
FIG. 1 is an illustration of a pre-cooler in accordance with one embodiment

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments described and/or illustrated herein provide a bypass cooler, also referred to as a bypass pre-cooler for a heat exchanger. For example, one embodiment provides an aircraft bleed system pre-cooler that is operable to bypass a plate fin air heat exchanger. However, it should be appreciated that the various embodiments may be used in connection with different systems within an aircraft, for example, at the inlet or exhaust of a compressor boosted engine bleed system. Additionally, the various embodiments are not limited to aircraft application, but the bypass pre-cooler of various embodiments may be used in non-aircraft applications. For example, the various embodiments may be used in land, air, sea and space applications.

The bypass pre-cooler of various embodiments is operable to delay the switching to a higher stage of, for example, an engine high pressure compressor to meet certain cooling pack requirements, which results in reduced fuel burn during cruise. Additionally, various embodiments may allow next generation engines (e.g., aircraft engines) to work with older generation aircraft cooling packs. As used herein in various embodiments, "aircraft cooling pack" generally refers to an air cycle refrigeration system that uses air passing through and into the aircraft as the refrigerant. For example, the aircraft cooling pack may be a system having a combined turbine and compressor machine, such as an air cycle machine, valves for temperature and flow control, and one or more heat exchangers. The aircraft cooling pack (also referred to an air condition pack) generally provides conditioned air to an airplane cabin at a desired temperature, flow rate and pressure to satisfy pressurization and temperature control requirements.

In various embodiments, a bypass pre-cooler arrangement 20 may be provided as illustrated in FIG. 1. The bypass pre-cooler arrangement 20 is configured having an internal by-pass arrangement within a housing 22 that includes a heat exchanger 24, which may be bypassed. The heat exchanger 24 may be any type of heat exchanging device and in one embodiment is a plate fin air heat exchanger. In this embodiment, the heat exchanger 24 uses plates or finned chambers 26 to transfer heat from air flowing into an inlet 36 (e.g., an air receiving port) of the housing 22 using the heat exchanger 24 when the air flow is through the heat exchanger 24. In some embodiments, the finned chambers 26 are formed from layers of corrugated sheets separated by flat metal plates, such as aluminum plates. However, the finned chambers 26 may have different configurations and be formed from different materials.

In some embodiments, separate hot and cold fluid streams flow through alternating layers of the heat exchanger 24 with heat transferred from one stream through the fin interface to a separator plate (formed by the flat metal plates 60 shown in FIGS. 5 through 11) and through the next set of fins into the adjacent fluid (e.g., air). It should be noted that the size, shapes and configurations of the finned chambers 26 may be varied, for example, based on the particular application.

The heat exchanger 24 is coupled to a valve 28 (e.g., fluidly coupled to a linear valve) on the inlet 36 side of the housing 22. In one embodiment, the valve 28 is a sleeve valve operable to direct or partially direct air flow from the inlet 36 to or away from the heat exchanger 24 as described in more detail herein. For example, airflow into the inlet 36 may be allowed to flow to the heat exchanger 24 and/or also to bypass the heat exchanger 24.

In the illustrated embodiment, an actuator 30 is coupled to the valve 28 to control the valve 28 to direct airflow within the housing 22. For example, the actuator 30 in some embodiments is operable to move one or more sleeve(s) 32 of the valve 28, for example, sliding or rotating the sleeve 32 to allow airflow therethrough to the heat exchanger 24 or redirect airflow via one or more ports 34 to bypass some of the airflow from the heat exchanger 24. Thus, the sleeve 32 is operable, for example, to align with one or more of the ports 34 to allow airflow through the heat exchanger 24 or redirect airflow (e.g. some of the airflow) from passing through the heat exchanger 24 in a bypass mode of operation as described in more detail herein. It should be noted that the movement of the sleeves 32 may take different forms, for example, sliding movement or rotating movement, among others. It also should be noted that the actuator 30 may any type of actuator, for example, a mechanical and/or electric actuator that controls the operation of the valve 28. The actuator 30 may control operation of the valve 28 automatically (e.g., based on a sensed air pressure) or manually, such as based on a user input (e.g., a manual override). For example, the actuator 30 may include a motor and/or other control mechanisms suitable for moving or controlling the movement of the valve 28. It should be noted that the connection of the actuator 30 to the valve 28 is merely exemplary and the actuator 30 may be connected at different locations of the valve 28, for example, based on a particular configuration, design, etc.

The inlet 36 of the housing 22 may be any type of opening into the housing 22 and in some embodiments allows airflow into a diffusion section 38, which may be a tapered section. The diffusion section 38 is coupled to a duct section (not shown in FIG. 1) via the valve 28. The duct section is then coupled to the heat exchanger 24. Additionally, the valve 28 is coupled to a bypass section 40 that allows redirection of airflow from the inlet 36 away from the heat exchanger 24, which in the illustrated embodiment, is shown as around the heat exchanger 24. The bypass section 40 may be formed in different ways, for example, using bypass ducts or in some embodiments, is formed form a double wall structure surrounding (an optionally formed in part by) the heat exchanger 24.

It should be noted that the diffusion section 38 may be any type of diffuser configuration that affects or controls the characteristics of airflow at the inlet 36. It also should be noted that the diffusion section 38 may have different shapes and sizes, for example, based on the amount of airflow at the inlet 36.

The housing 22 also includes an outlet 42 (or an exhaust), which in the illustrated embodiment is an opening opposite the inlet 36. However, it should be noted that the inlet 36 and the outlet 42 may be positioned at different locations along the housing 22, such as based on the system to which the bypass pre-cooler arrangement 20 is to be connected. The outlet 42 is coupled to the heat exchanger 24 and the bypass section 40 to provide a fluid path out of the housing 22. Thus, in operation, air flow may be provided from the inlet 36 to the outlet 42 through the heat exchanger 24 and/or the bypass section 40. The inlet 36 and outlet 42 may have different shapes and sizes. For example in one embodiment, the inlet 36 and outlet 42 have the same configuration including an opening having a diameter of about three inches. However, in other embodiments, the inlet 36 and outlet 42 may have different shapes, sizes or configurations.

It should be noted that although the housing 22 is illustrated as generally cylindrical in shape, the housing 22 may have different shapes and configurations as illustrated in other embodiments described herein. Additionally, the housing 22 may be formed from any suitable material. Also, the components within the housing 22, such as the heat exchanger 24 may be coupled therein in different configurations and using different mounting arrangements (e.g., brackets or fasteners).

In one embodiment, the valve 28 is a sleeve valve (e.g., a Y-valve) configured as two concentric cylinders operable to direct or control air flow from the inlet 36 to the heat exchanger 24 and/or the bypass section 40. For example, in one particular embodiment, the inlet is a high pressure hot air inlet header that is coupled to one or more ducts of a core engine flow, such as a first duct extending from a low pressure section of a core engine flow and a second duct extending from a high pressure section of a core engine flow as described in more detail herein. In this embodiment, the outlet 42 is a high pressure cold outlet header that in some embodiments is connected to an air duct system for a cabin of a passenger aircraft. In various embodiments, the pre-cooler arrangement 20 may form part of, for example, an aircraft cooling pack.

In various embodiments, one or more sensors (not shown) may be provided downstream of the bypass pre-cooler arrangement 20 (e.g., at a downstream duct) to monitor the pressure of the airflow at that downstream location. In these embodiments, the bypass pre-cooler arrangement 20 may be used in connection with a method for pressurizing an aircraft cabin, such as forming part of an aircraft cooling pack. For example, during aircraft flight, the aircraft engine is operated with air from the aircraft engine bled at a high pressure stage and/or a low pressure stage of the engine to the bypass pre-cooler arrangement 20. In this embodiment, the monitored airflow at the downstream location is used to control airflow with the bypass pre-cooler arrangement 20, namely to direct the flow of air to the heat exchanger 24 and/or the bypass section 40. For example, the pressure at the downstream location may be monitored and based on a predetermined or threshold pressure level, the valve 28 within the housing 22 may be controlled to direct airflow therein to duct the bleed air through and/or around the heat exchanger 24.

Figure 2:
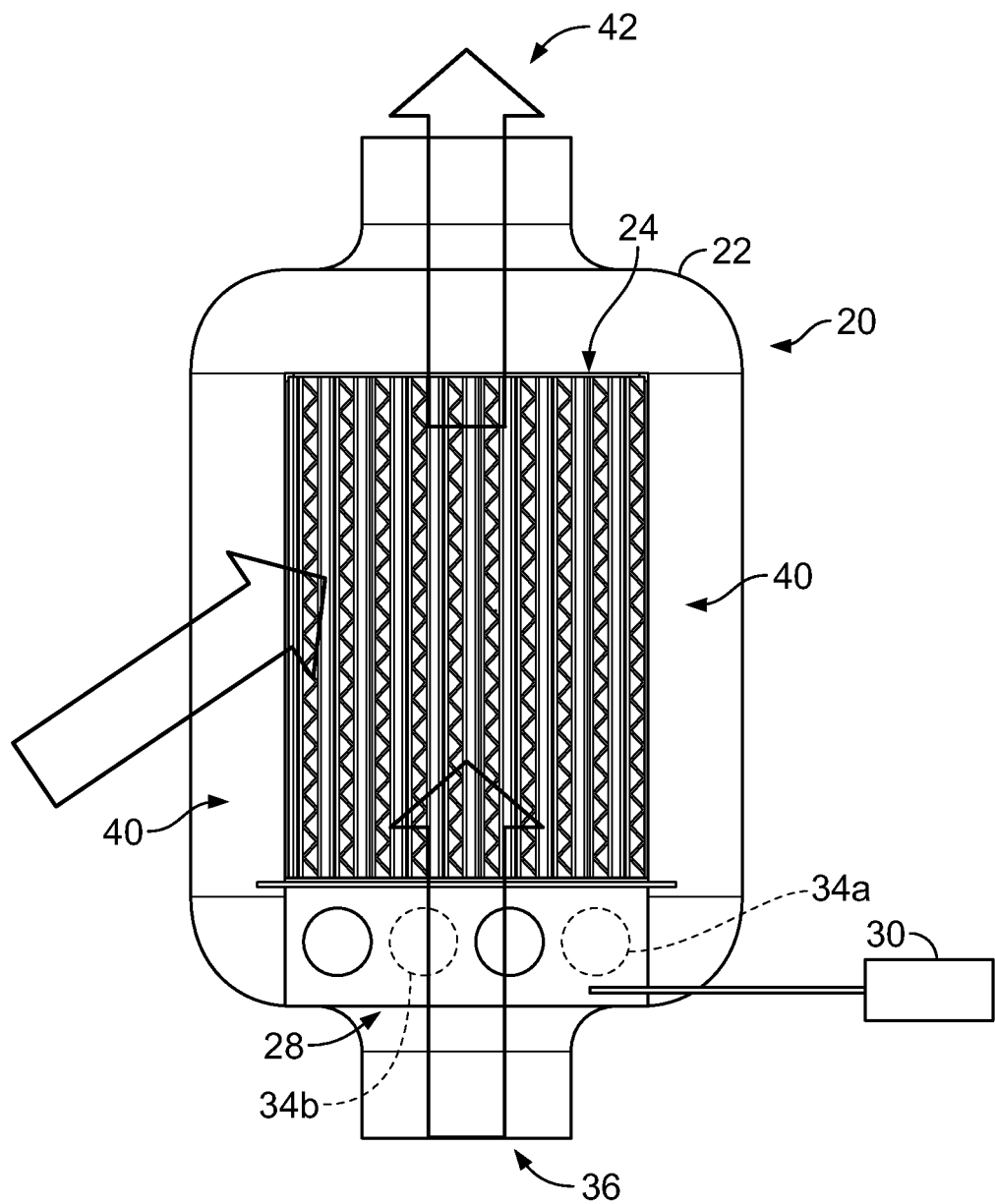
FIG. 2 is an illustration of the pre-cooler of FIG. 1 is a normal operating mode.

For example, FIG. 2 illustrates a normal operating mode of the bypass pre-cooler arrangement 20. In this mode of operation, air at the inlet 36 is allowed to flow through the heat exchanger 24 and out of the outlet 42 as cooled air as illustrated by the arrows. In this mode of operation, the valve 28 blocks the ports 34a and 34b, thereby preventing air flow through the bypass section 40. For example, bleed air from the core engine flow is allowed to flow through the heat exchanger 24 for cooling (and not through the bypass section 40), which then may be provided to ducts providing conditioned air to an airplane cabin. It should be noted that air is also flowing across the heat exchanger 24 as represented by the arrow to the left of the housing 22 (shown in FIGS. 2 and 3). For example, ambient air may be allowed to continuously flow across the heat exchanger 24 at a face generally perpendicular to the airflow within the housing 22.

Figure 3:
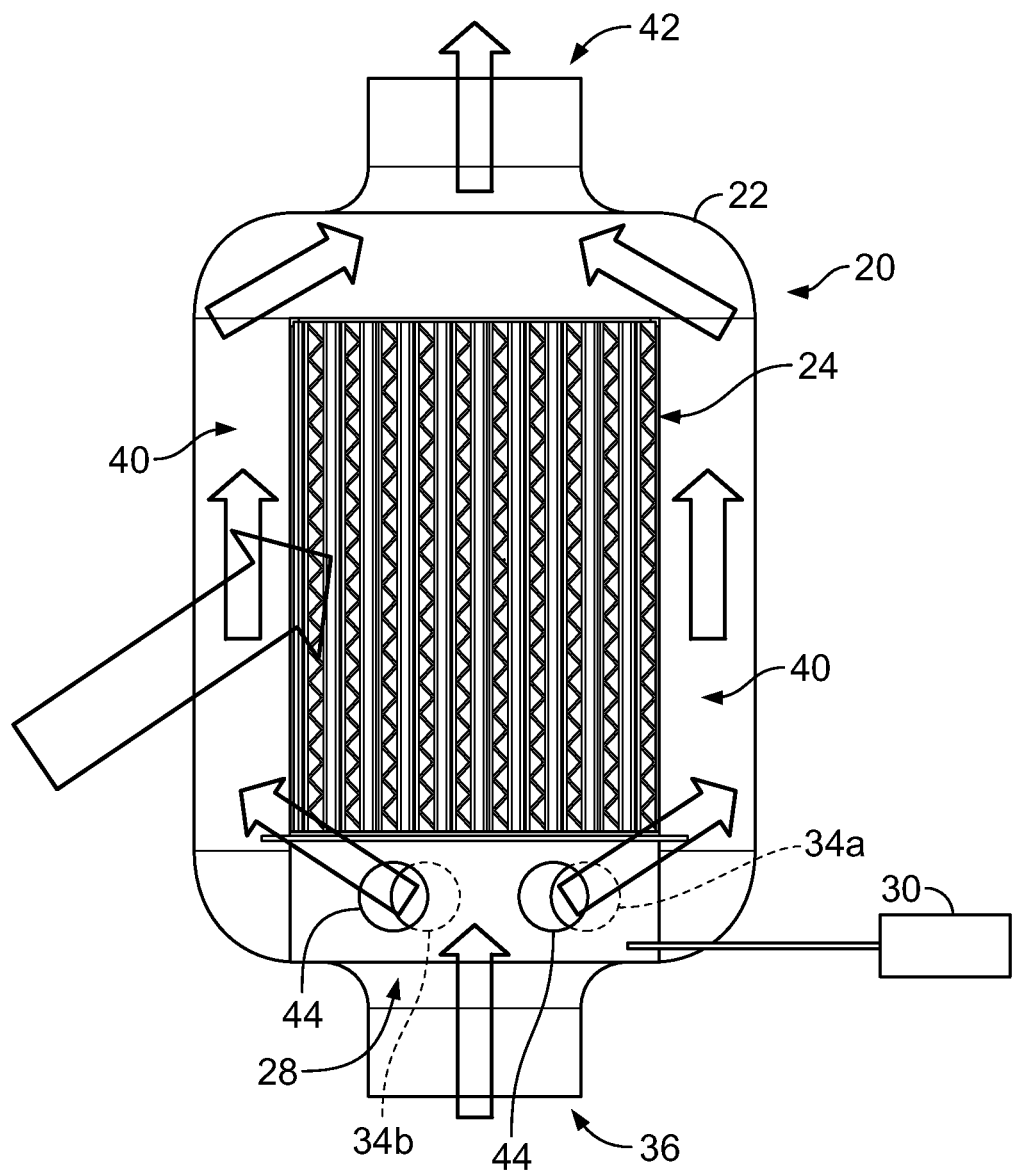
FIG. 3 is an illustration of the pre-cooler of FIG. 1 is a bypass operating mode.

FIG. 3 illustrates a bypass operating mode of the bypass pre-cooler arrangement 20. In this mode of operation, air at the inlet 36 is redirected to flow through or at least partially through the bypass section 40. It should be noted that all of the air at the inlet 36 may be redirected to flow through the bypass section 40, thereby not being cooled by the heat exchanger 24 as illustrated by the arrows. However, in some embodiments, in the bypass mode of operation, air at the inlet 36 is directed to flow to the heat exchanger 24 and the bypass section 40 (e.g., based on the sensed pressure at the downstream location), such that some of the air is cooled by the heat exchanger 24 while some of the air is not cooled by the heat exchanger 24 and passes through the bypass section 40 to the outlet 42. In this bypass mode of operation, the valve 28 either partially blocks the ports 34a and 34b or does not block the ports 34a and 34b (which provide an airflow path to the bypass section 40) by moving the position of openings 44 to align or partially align with the ports 34a and 34b as shown in FIG. 3. For example, in some embodiments, bleed air from the core engine flow is allowed to flow through the bypass section 40 and also through the heat exchanger 24.

Figure 4:
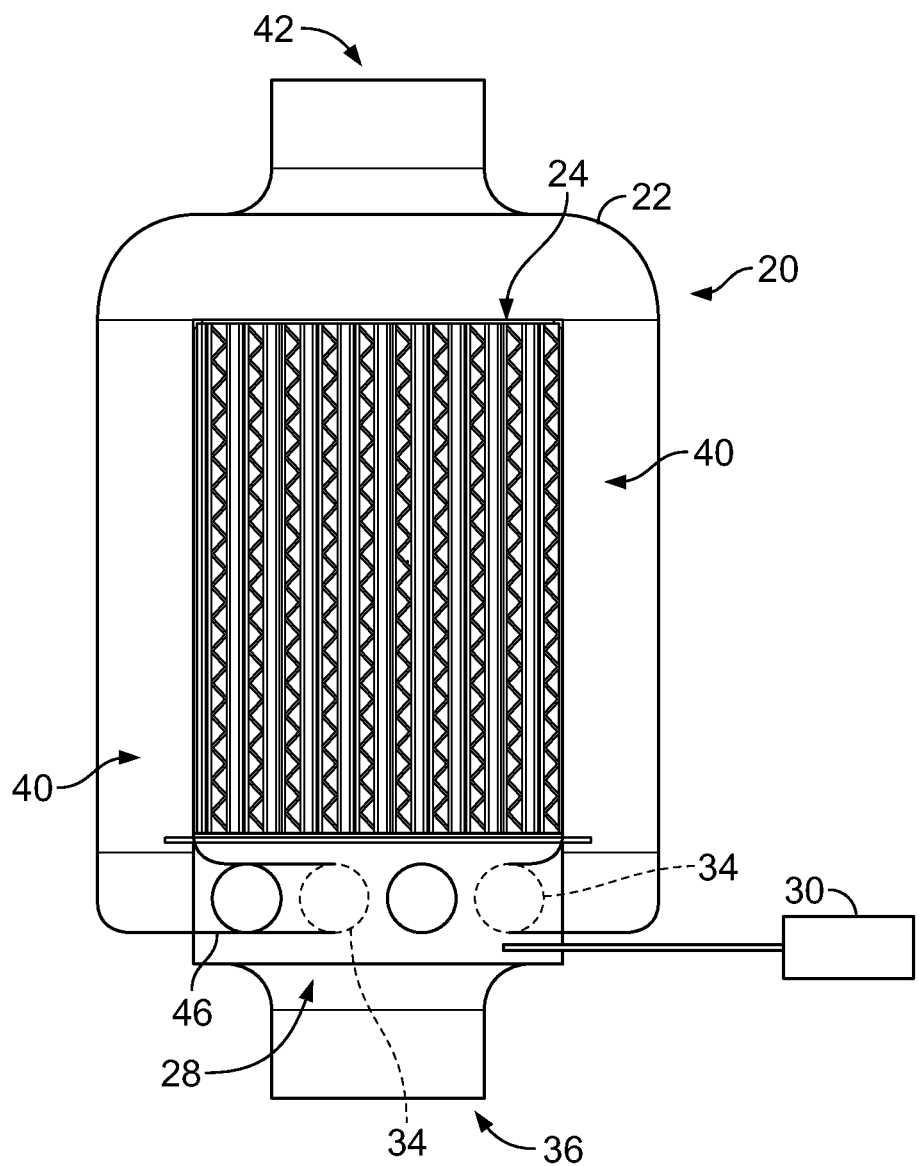
FIG. 4 is an illustration of a pre-cooler having a pipe manifold configuration in accordance with one embodiment.
Figure 5:
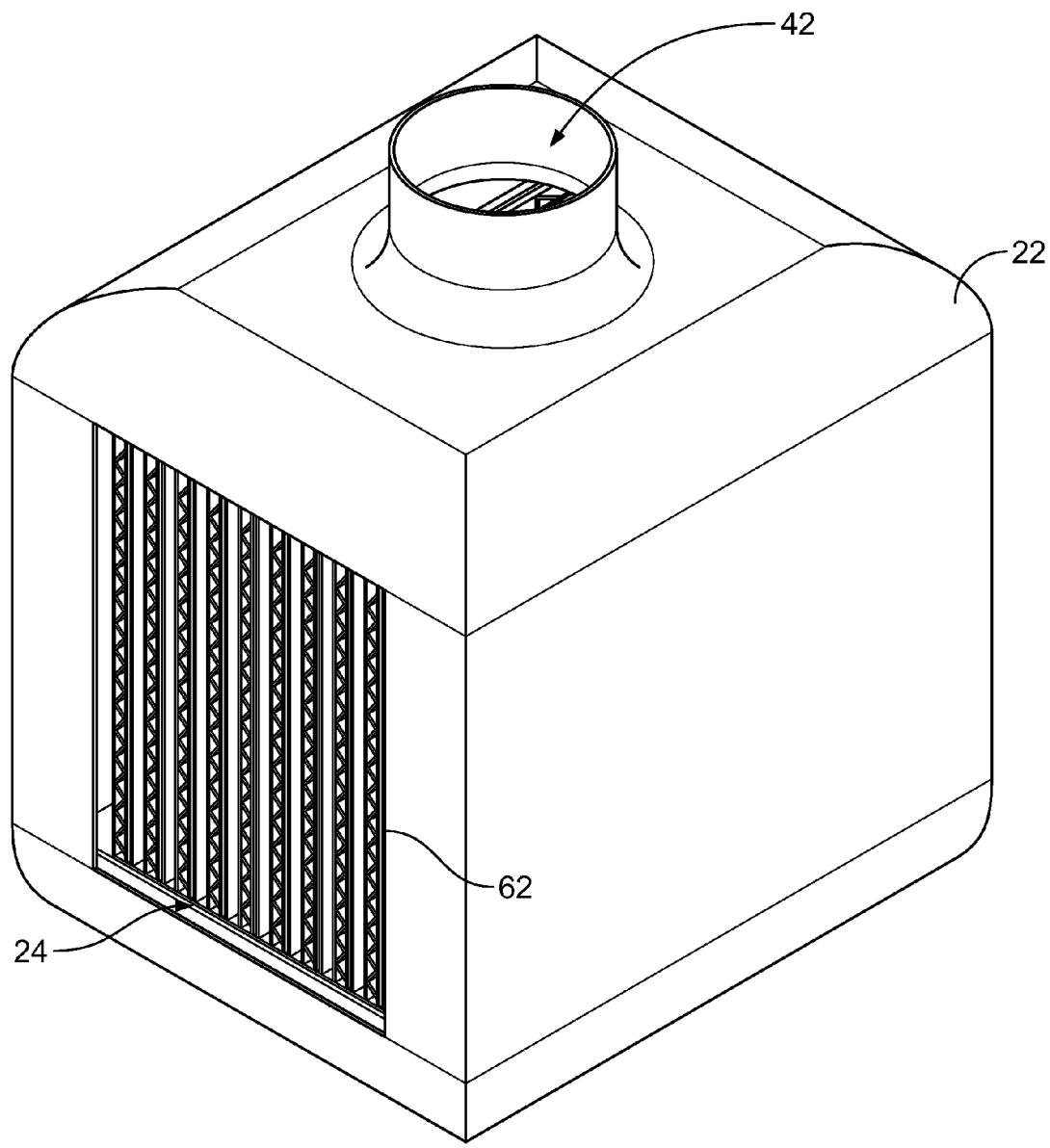
FIG. 5 is an isometric illustration of a pre-cooler in accordance with one embodiment.
Figure 7:
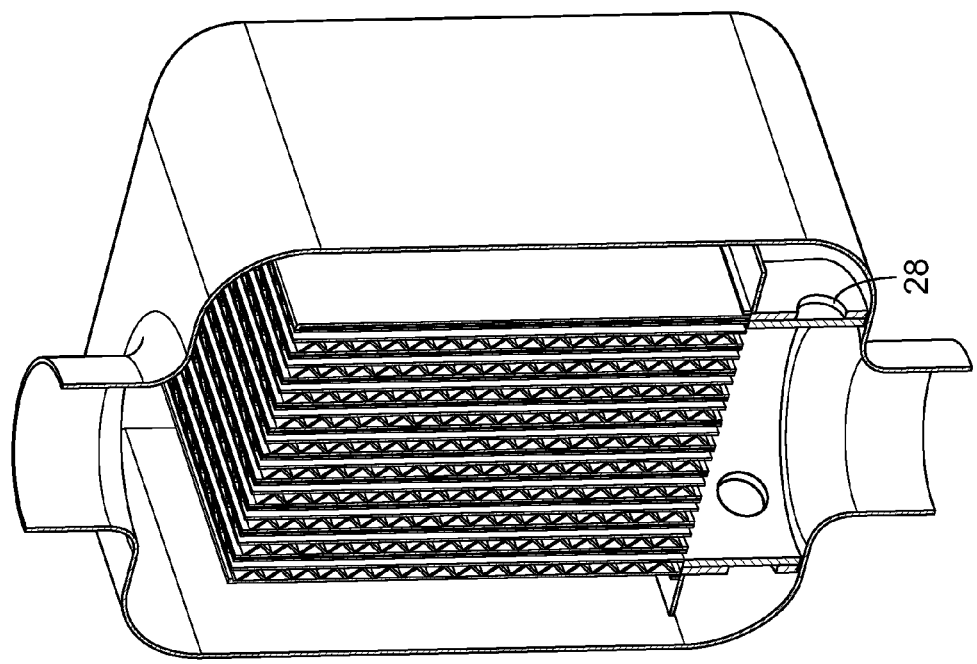
FIG. 7 is a cross-sectional isometric illustration of a pre-cooler in accordance with one embodiment.
Figure 6:
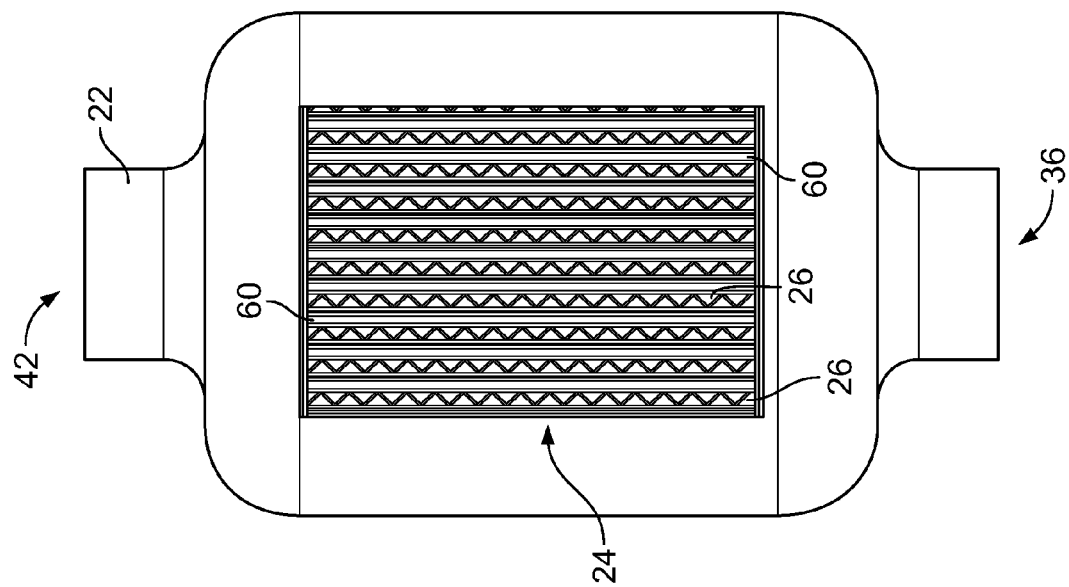
FIG. 6 is another illustration of a pre-cooler in accordance with one embodiment.

FIG. 4 illustrates one embodiment of a pipe manifold configuration of the bypass pre-cooler arrangement 20. In this embodiment, instead of having a double wall structure forming the bypass section 40 (as illustrated in FIGS. 1 through 3), a pipe manifold 46 is provided and coupled to the ports 34 of the valve 28. The pipe manifold 46 may be coupled to the valve 28 in different ways, for example, by welding. The pipe manifold 46 provides a fluid passageway separate from the airflow path through the heat exchanger 24, such as around the heat exchanger 24 as shown in FIG. 4 to define the bypass section 40.

Figure 8:
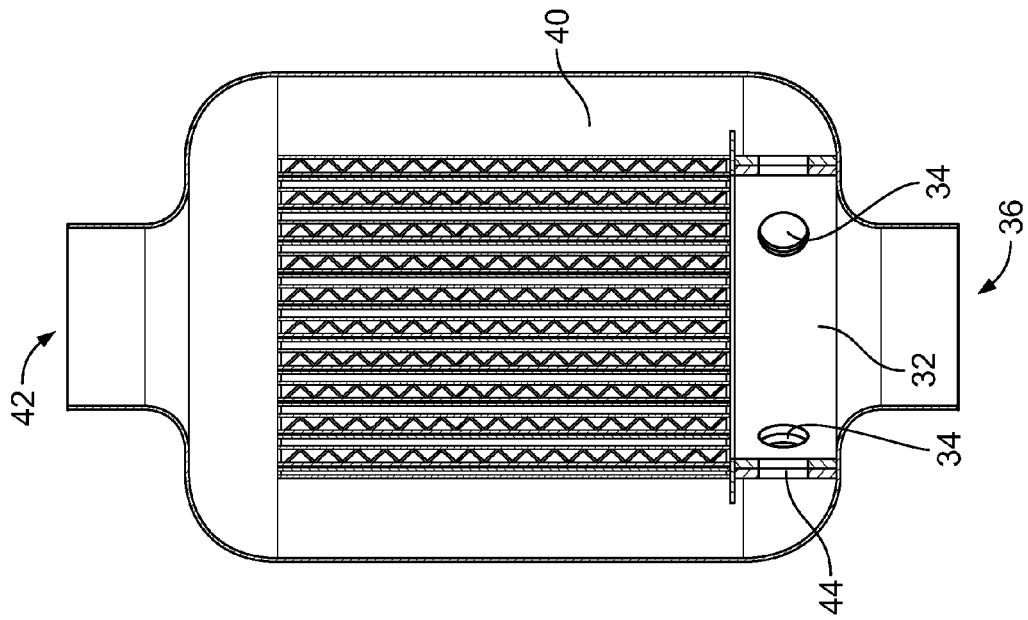
FIG. 8 is an illustration of a pre-cooler in accordance with one embodiment showing an open position of a sleeve valve.
Figure 9:
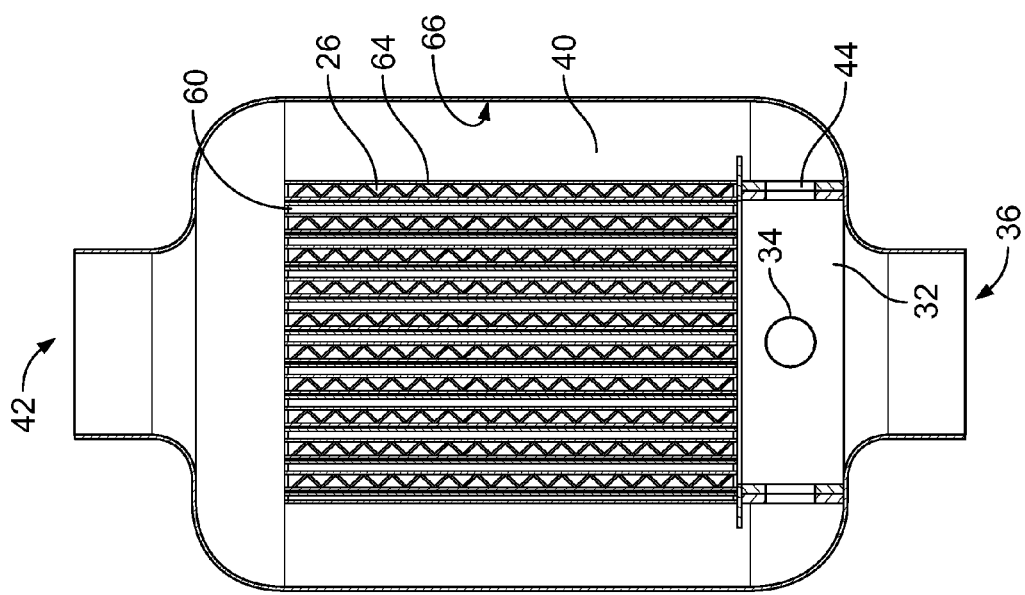
FIG. 9 is an illustration of a pre-cooler in accordance with one embodiment showing a closed position of a sleeve valve.
Figure 10:
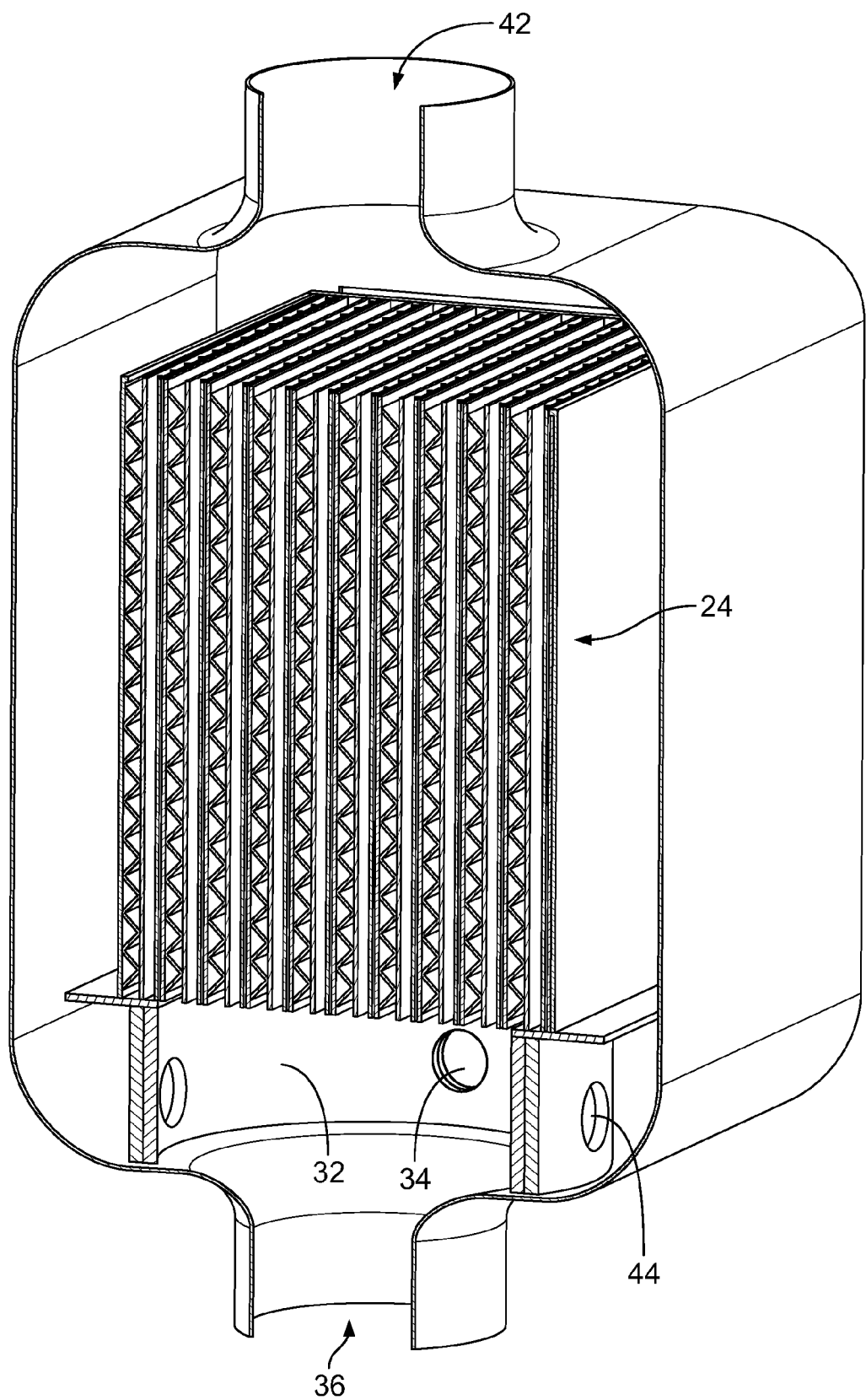
FIG. 10 is another illustration of a pre-cooler in accordance with one embodiment showing an open position of a sleeve valve.
Figure 11:
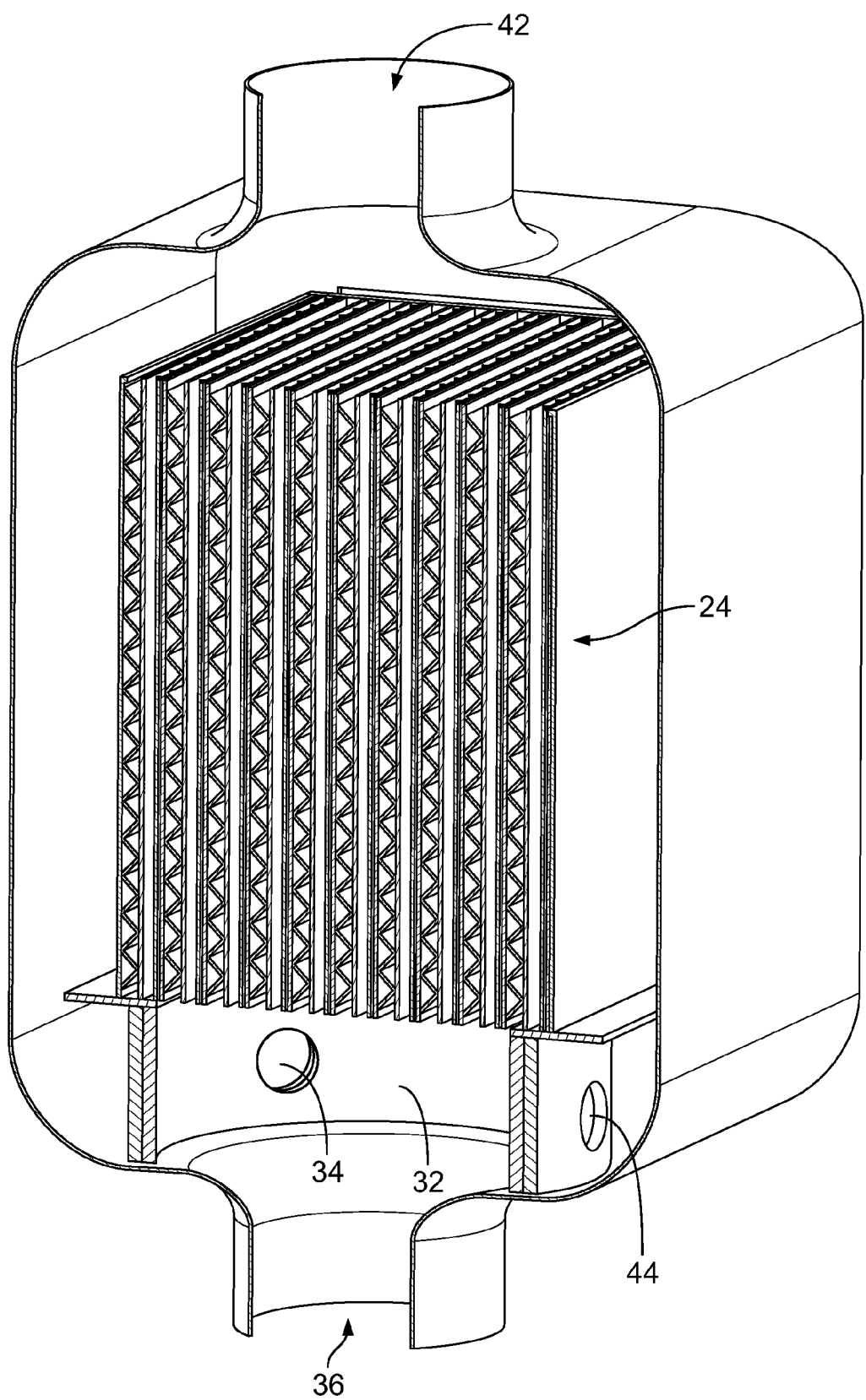
FIG. 11 is another illustration of a pre-cooler in accordance with one embodiment showing a closed position of a sleeve valve.
Figure 12:
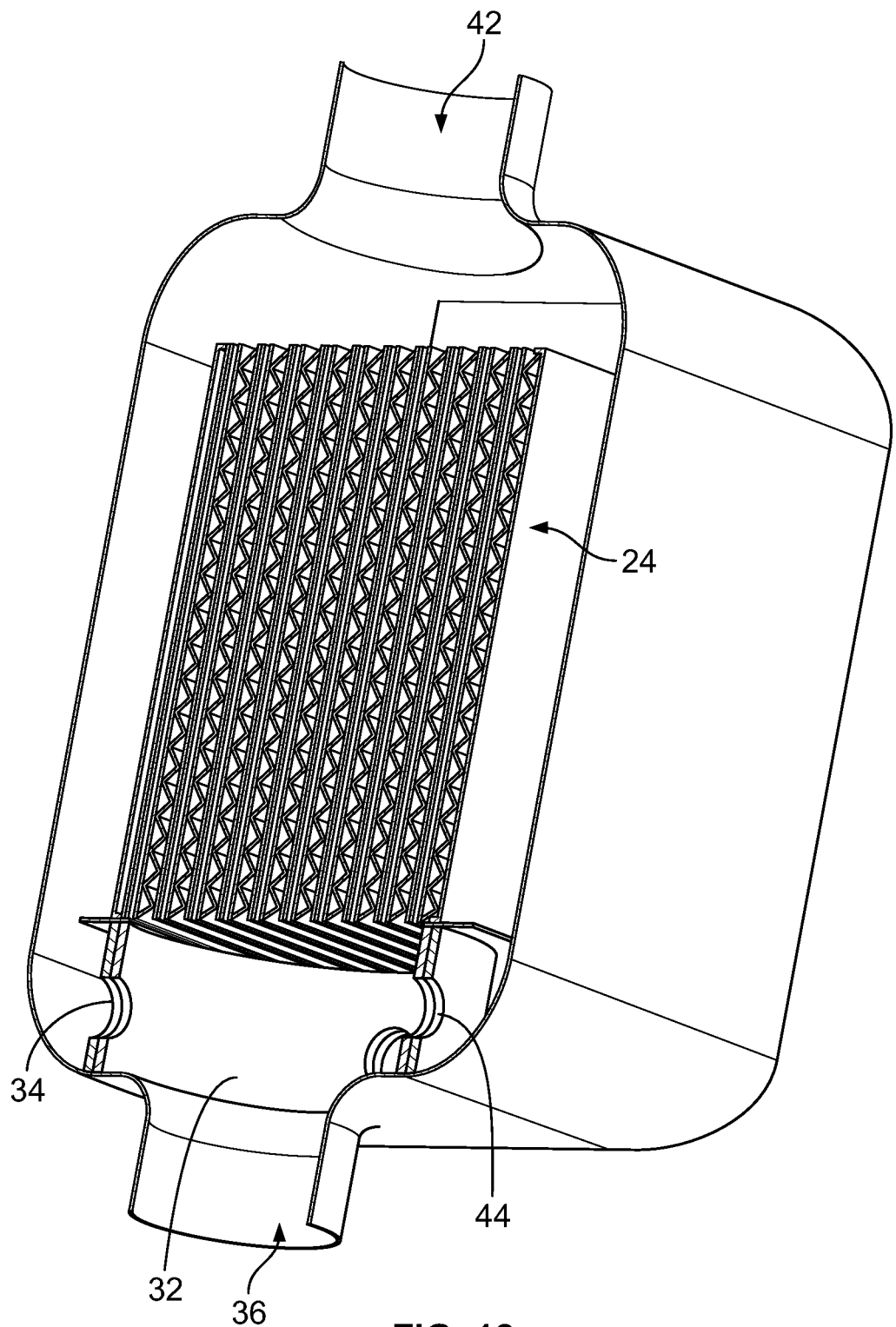
FIG. 12 is another cross-sectional isometric view of a pre-cooler in accordance with one embodiment.

FIGS. 5 through 12 illustrate one configuration of the bypass pre-cooler arrangement 20. In this embodiment, the inlet 36 is at the bottom of the housing 22 as viewed in FIG. 6 and the outlet 42 is at the top of the housing 22. As can be seen, an opening 62 is also provided adjacent the heat exchanger 24 to allow flow of air through the heat exchanger 24 from outside the housing 22, in particular, flow of air across and through the finned chamber 26. The opening 62 in various embodiments is sized and shaped about the same as the dimensions of the heat exchanger 24. FIGS. 8 and 10 illustrate the sleeve 32 in an open position defining the normal mode of operation where air flows into the inlet 36 and through the heat exchanger 24, but is blocked from the bypass section 40. FIGS. 9 and 11 illustrate the sleeve 32 in a closed position defining the bypass mode of operation wherein air flow is allowed through the bypass section 40, which in this embodiment is formed from a double wall arrangement between an outside wall 64 of the heat exchanger 24 and an inner wall 66 of the housing 22. In the illustrated embodiment, the sleeve 32 is operable to rotate and align the openings 44 with the ports 34 or block access to the ports 34 with the body of the sleeve 32 to direct airflow within the housing 22. As described herein, different valve and sleeve arrangements may be provided to direct the air flow from the inlet 36.

Figure 13:
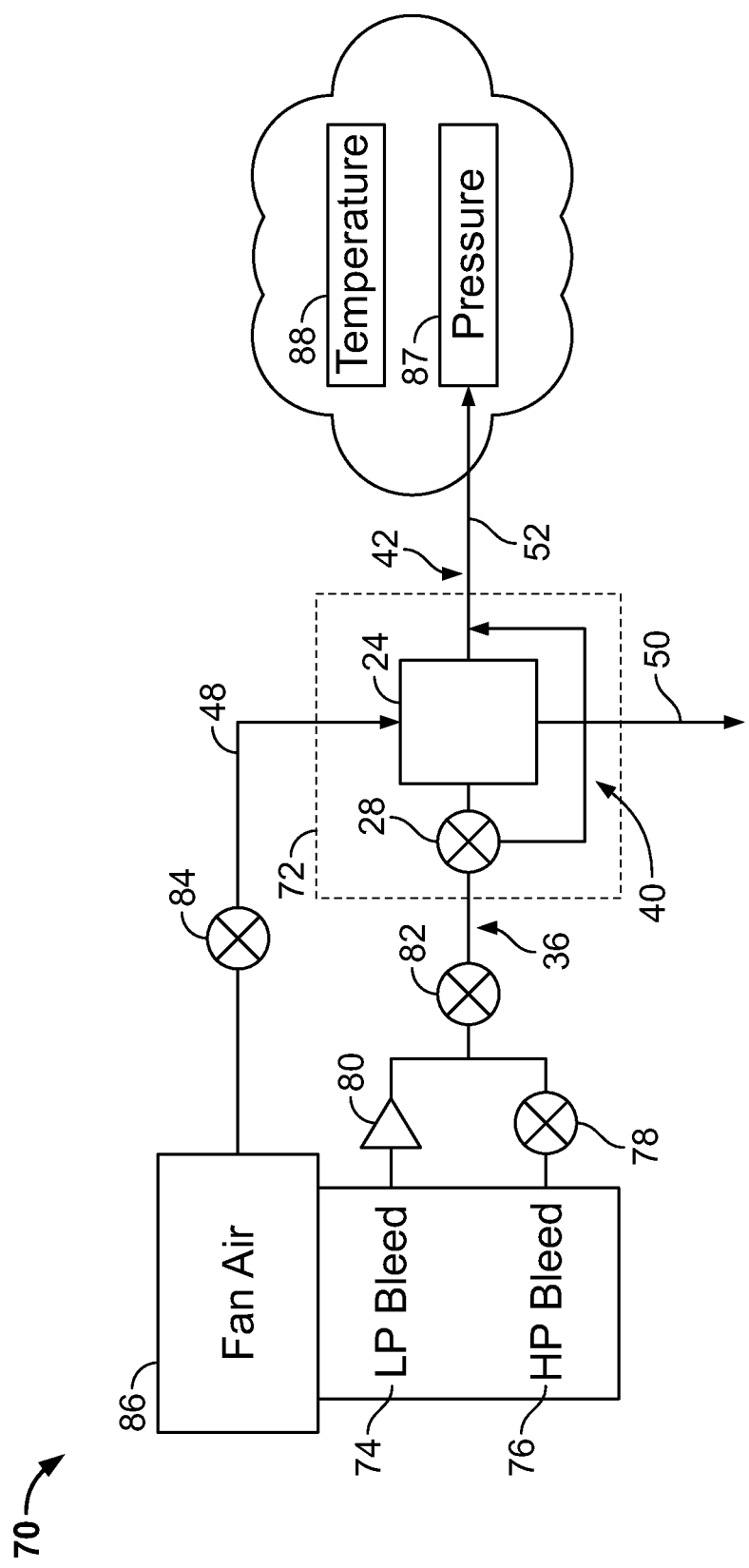
FIG. 13 is an illustration of a bleed system having a pre-cooler in accordance with one embodiment.

Various embodiments provide the bypass pre-cooler arrangement 20 having an internal bypass configuration. The bypass pre-cooler arrangement 20 may be used, for example, to allow a high pressure duct to be diffused (into a larger diameter duct section) with the pressure dropped and then passing through the valve 28 that is operable or actuated based on pressure demand needs as described in more detail herein. In various embodiments, the bypass pre-cooler arrangement 20, and in particular, the operation of the valve 28, allows hot high pressure air to move through and/or around the heat exchanger 24. For example, FIG. 13 illustrates an air flow control system 70 in which various embodiments may be implemented and which may also be referred to as a bleed system 70. In particular, the bypass pre-cooler arrangement 20 is illustrated as a bypass pre-cooler 72. In this embodiment, the inlet 36 of the bypass pre-cooler 72 is connected to ducting of engine ports (not shown), for example, of an aircraft engine, that is configured to bleed air to the bypass pre-cooler 72.

In particular, ports in this arrangement are connected to low pressure bleed section (LP Bleed) 74 and a high pressure bleed section (HP Bleed) 76, which may correspond to low pressure and high pressure engine ports that define low and high pressure stages, respectively, of the engine. For example, HP Bleed air may be received from a higher stage of a high pressure compressor to receive engine air that is hot and at a high pressure (e.g., 1000 psi) through a High Pressure Shutoff Valve (HPSOV) 78. Additionally, LP Bleed air may be received from a lower stage of the high pressure compressor through a check valve 80, for example connected to low pressure engine ports that define the low pressure stage of the engine. For example, the air from the lower stage of the high pressure compressor, which is also hot air (e.g., 350 degrees Fahrenheit) and may be used to heat the airplane at cruising altitudes.

In the illustrated embodiment, the HPSOV 78 and the check valve 80 are connected to the inlet port 36 through a Pressure Regulating Shutoff Valve (PRSOF) 82 that regulates the outlet pressure of the bypass pre-cooler 72 as described in more detail herein. In one embodiment, the PRSOF 82 is operable between a full closed position to a full open position to provide between 0% and 100% air flow, respectively, to the inlet port 36. Thus, the PRSOF 82 may block or allow airflow from the LP Bleed 74 or the HP Bleed 76 to the inlet port 36.

Additionally, a Fan Air Modulating Valve (FAMV) 84 is provided between the heat exchanger 24 a source of fan air 86. The FAMV 84 regulates the outlet temperature of the bypass pre-cooler 72 as described in more detail herein. In one embodiment, the FAMV 84 is operable between a full closed position to a full open position to provide between 0% and 100% air flow, respectively, to the heat exchanger 24. Thus, the FAMV 84 may block or allow airflow from the source of fan air 86 to the heat exchanger 24. The airflow from the source of fan air 86 passes through the heat exchanger 24, in particular the finned chambers 26 (shown in FIG. 1), as illustrated by the arrow 48 entering the heat exchanger 24 and the arrow 50 exiting the heat exchanger. The flow of air through the heat exchanger 24 exits the housing 22 (shown, for example, in FIGS. 1-5) of the heat exchanger 24 and is sent, for example, undercowl (in a core compartment) or overboard (such as via ducting) to the atmosphere.

Thus, in various embodiments the PRSOV 82 allows bleeding of air into the bypass pre-cooler 72, such as from the low(er) and/or higher) pressure stages of the engine based on a pressure 87 (e.g., a pressure measurement) downstream from the bypass pre-cooler 72. Additionally, based on a temperature 88 (e.g., temperature measurement) downstream from the bypass pre-cooler 72, the FAMV 84 controls air flow from the source of fan air 86 to the heat exchanger 24. For example, at higher altitudes at a lower pressure stage, fan air may be prevented from entering the bypass pre-cooler 72. As described in more detail herein, in one embodiment, the outlet 42 is connected to one or more ducts (not shown) that provide airflow to or within the aircraft as represented by the arrow 52, which is downstream from the bypass pre-cooler 72.

Thus, in operation in various embodiments, the bypass pre-cooler 72 receives bleed air at the inlet 36 and outputs air at the outlet 42, which may or may not be redirected through the bypass section 40. The outlet 42 is connected to one or more ducts (not shown) that provide airflow to or within the aircraft, such as to the passenger cabin. Additionally, fan air is provided to the heat exchanger 24. Using the bypass pre-cooler 72, the switch over to the high pressure stage (such as when throttling up) is delayed by using the bypass arrangement of the bypass pre-cooler 72 as described in more detail herein. In particular, various embodiments may use the bypass pre-cooler 72 to allow operation at the lower pressure stage for a longer period of time by bypassing the heat exchanger 24. Thus, although when the aircraft throttle is increased, bleed airflow switches from the low pressure ports to the high pressure ports, various embodiments allow the switch to be delayed by maintaining a lower pressure (e.g., 80 psi) within the ducting.

Figure 14:
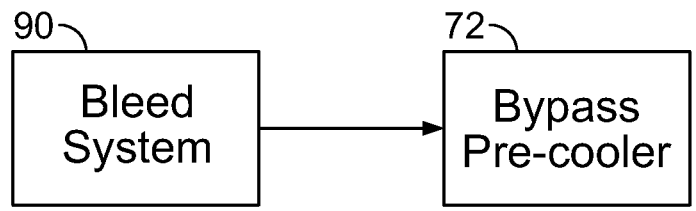
FIG. 14 a block illustration showing a configuration of a pre-cooler in accordance with one embodiment.
Figure 15:
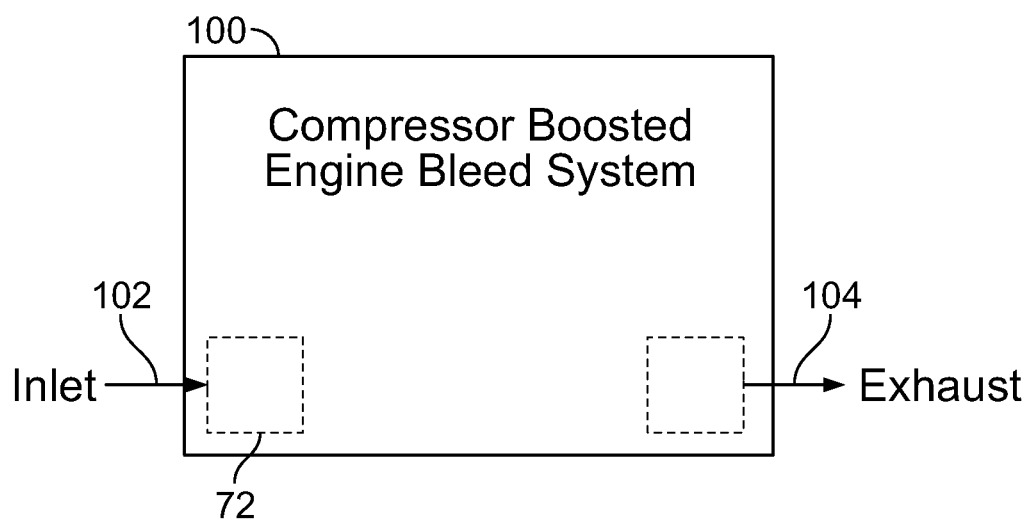
FIG. 15 a block illustration showing another configuration of a pre-cooler in accordance with one embodiment.

Accordingly, in some embodiments, the bypass pre-cooler 72 may be coupled to or form part of a bleed system 90 as shown in FIG. 14. One embodiment of such a configuration is illustrated in FIG. 13. However, various embodiments may be used in different applications or configurations. For example, the bypass pre-cooler 72 may be used in connection with a compressor boosted engine bleed system 100 as shown in FIG. 15. As shown in FIG. 15, the bypass pre-cooler 72 may be provided at the inlet 102 of the compressor boosted engine bleed system 100 or at the exhaust (or outlet) 104 of the compressor boosted engine bleed system 100. The bypass pre-cooler 72 may be provided as described in more detail herein. In operation with the compressor boosted engine bleed system 100, when the compressor pressure ratio is nominally low and the heat exchanger 24 is not needed, the bypass pre-cooler 72 operates to bypass the heat exchanger 24 at either the inlet 102 or exhaust. When the compressor pressure ratio is higher, such as above a predetermined level or threshold, the bypass pre-cooler 72 allows airflow through the heat exchanger 24 such that the pressure drop across the heat exchanger 24 is acceptable.

Figure 16:
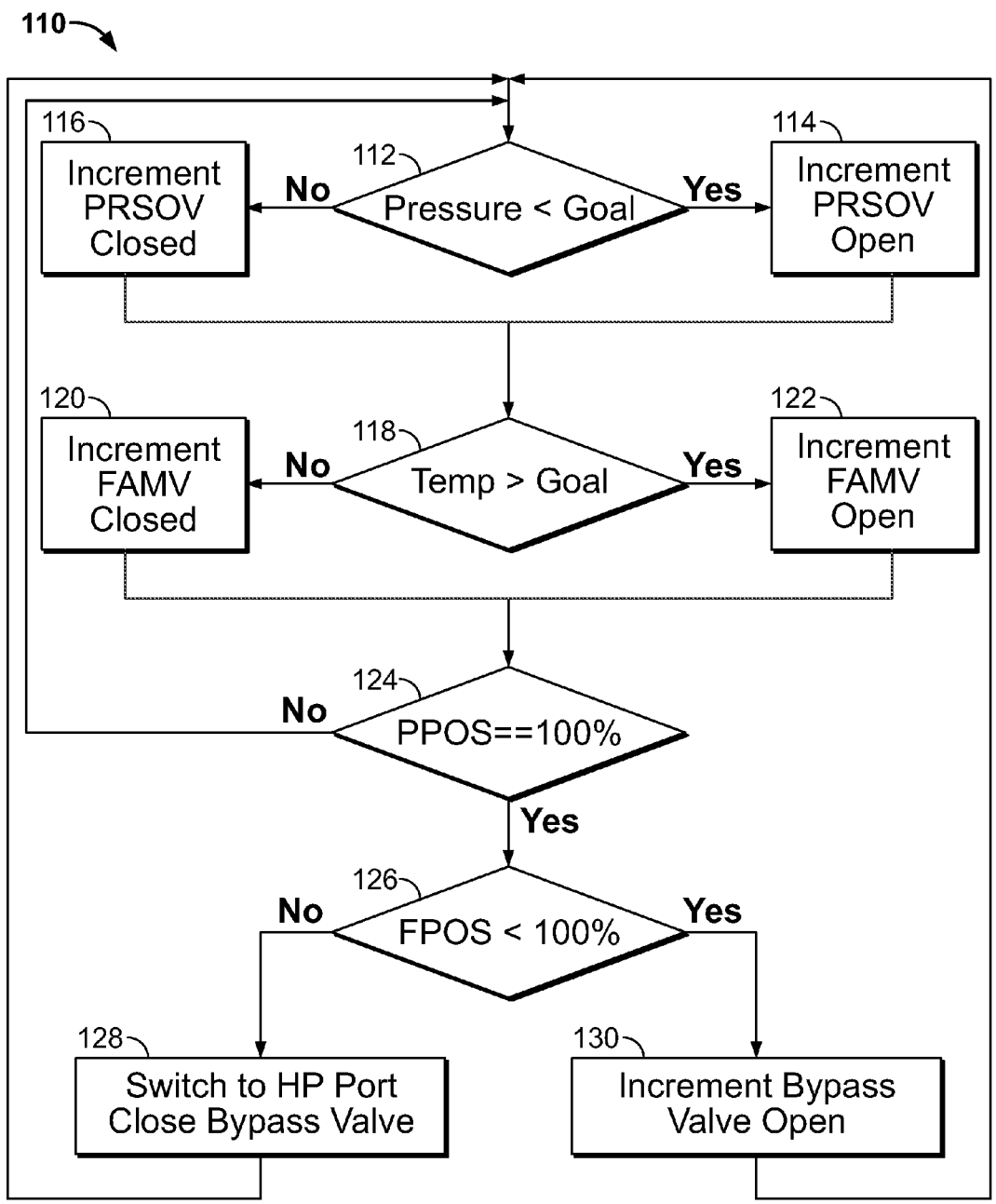
FIG. 16 is an illustration of operations performed by one embodiment to control airflow.

Various embodiments also provide a method 110 for controlling airflow to a heat exchanger, such as within an aircraft, as shown in FIG. 16. In various embodiments, certain steps may be omitted or added, certain steps may be combined, certain steps may be performed simultaneously, or concurrently, certain steps may be split into multiple steps, certain steps may be performed in a different order, or certain steps or series of steps may be re-performed in an iterative fashion.

In the illustrated embodiment, the method 110 includes monitoring air pressure, such as within a duct system at 112 to determine whether the air pressure is less than a defined level (e.g., a predetermined pressure goal, which may include a variance above and below the goal). For example, air pressure downstream (or upstream) of a bypass pre-cooler is monitored with one or more sensors. Thus, at 112, a determination is made as to whether the air pressure has met a threshold level or value. It should be noted that the threshold determination may be made continuously or periodically.

If a determination is made at 112 that the pressure is less than a predetermined level (e.g., less than a goal), then the PRSOV 82 in one embodiment is incremented towards the open position at 114 (e.g., incremental opening of the valve by a determined amount). If a determination is made at 112 that the pressure is not below the predetermined level (e.g., greater than the goal), then at 116, the PRSOV 82 in one embodiment in incremented towards the closed position (e.g., incremental closing of the valve by a determined amount).

The method 110 also includes monitoring air temperature, such as within a duct system at 118 to determine whether the air temperature is greater than a defined level (e.g., a predetermined temperature goal, which may include a variance above and below the goal). For example, air temperature downstream (or upstream) of a bypass pre-cooler is monitored with one or more sensors. Thus, at 118, a determination is made as to whether the air temperature has met a threshold level or value. It should be noted that the threshold determination may be made continuously or periodically.

If a determination is made at 118 that the threshold air temperature is not greater than a predetermined level (e.g., less than a goal), then the FAMV 84 in one embodiment is incremented towards the closed position at 120 (e.g., incremental closing of the valve by a determined amount). If a determination is made at 118 that the temperature is greater than the predetermined level, then at 122, the FAMV 84 in one embodiment in incremented towards the open position (e.g., incremental opening of the valve by a determined amount).

The method also includes at 124 a determination of whether the Position of the PRSOV (PPOS) is equal to 100%. If the PPOS is not equal to 100%, then the method returns to step 112. However, if the PPOS is equal to 100%, then at 126 a determination is made as to whether the Fan Air Valve Position (FPOS) is less than 100%. If the FPOS in not less than 100%, then at 128, air flow is switched to a HP Port, for example, the HP Bleed 76 (shown in FIG. 13) and the bypass valve (e.g., the valve 28 shown in FIGS. 1-4 and 7-12) is closed. The method then returns to step 112. If the FPOS is less than 100%, then at 130 the bypass valve (e.g., the valve 28 shown in FIGS. 1-4 and 7-12) is incremented open (e.g., incremented a defined or predetermined amount). The method then returns to step 112.

Figure 17:
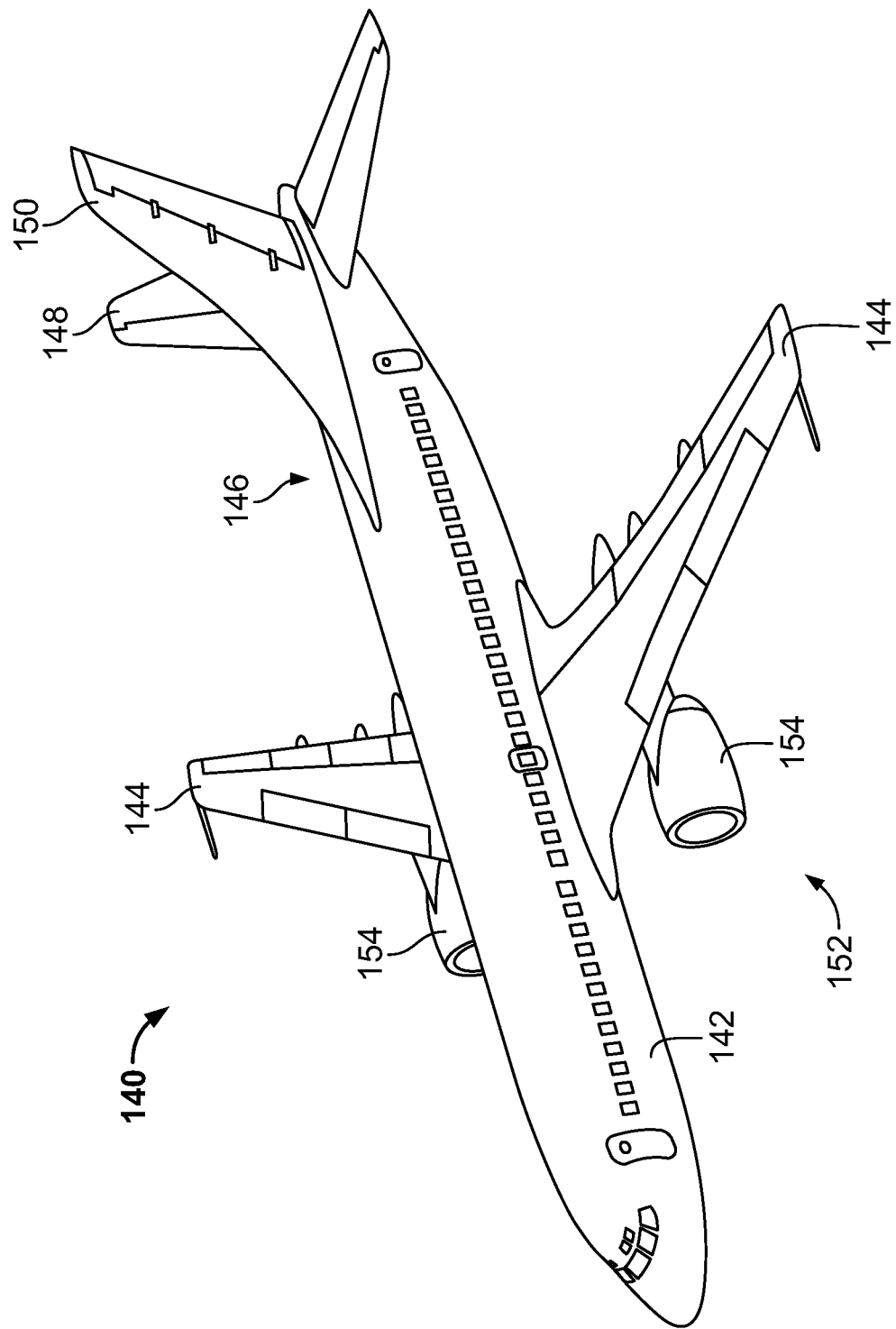
FIG. 17 is an illustration of an aircraft having a pre-cooler in accordance with one embodiment.

FIG. 17 illustrates an aircraft 140 having a propulsion system 152 with an air exhaust coupled to the aircraft cabin (e.g., providing bleed air) that may be cooled in accordance with various embodiments. However, it should be noted that various embodiments may be used in connection with other systems of the aircraft 140 to provide air cooling or other air control.

The propulsion system 152 may include two turbofan engines 154 that may have a core engine flow that operates at a high pressure stage and a low pressure stage as described in more detail herein. The engines 154 are carried by the wings 144 of the aircraft 140. In other embodiments, the engines 154 may be carried by the fuselage 142 and/or the empennage 146. The empennage 146 can also support horizontal stabilizers 148 and a vertical stabilizer 150. During flight of the aircraft 140, the various embodiments may operate to control bleed airflow from the engines 154, which may include directing airflow to the heat exchanger 24 or the bypass section 40 as controlled by the actuator 30 (all shown in FIGS. 1 through 4).

It should be noted that the various embodiments or portions thereof, such as the actuator 30 or other controls or components may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A bypass pre-cooler comprising:
a housing;
an inlet configured to receive core engine airflow into the housing from one or more aircraft ducts;
a heat exchanger within the housing;
a bypass section within the housing having an airflow path separate from and surrounding the heat exchanger;
a sleeve valve having an outer surface forming with the housing an annular inlet section of the bypass section, the sleeve valve coupled to the inlet and configured to switch airflow between the heat exchanger and the bypass section using circumferentially spaced ports;
an outlet coupled to the heat exchanger and the bypass section;
at least one processor;
a pressure sensor coupled to the at least one processor, wherein the pressure sensor monitors an air pressure downstream from the housing; and
an actuator coupled to the at least one processor and the sleeve valve to control opening and closing of the sleeve valve, wherein the at least one processor controls opening and closing of the sleeve valve based on the air pressure downstream of the housing as monitored by the pressure sensor.

2. The bypass pre-cooler of claim 1, wherein the one or more ducts comprise a first duct extending from a low pressure section of the core engine airflow and a second duct extending from a high pressure section of the core engine airflow.

3. The bypass pre-cooler of claim 1, wherein the inlet comprises a diffusion section.

4. The bypass pre-cooler of claim 1, further comprising a double wall structure within the housing forming the bypass section.

5. The bypass pre-cooler of claim 1, further comprising a pipe manifold forming the bypass section.

6. The bypass pre-cooler of claim 1, wherein the heat exchanger comprises a plate fin air heat exchanger.

7. The bypass pre-cooler of claim 1, wherein the at least one processor delays switching over to a high pressure stage from a low pressure stage by controlling the actuator to bypass the airflow around the heat exchanger.

8. A method of pressurizing an aircraft cabin, the method comprising:
operating an aircraft engine;
ducting bleed air from the aircraft engine at a high pressure stage and a low pressure stage of the engine;
ducting the bleed air to a bypass pre-cooler within a housing, the bypass pre-cooler having a heat exchanger and a bypass section separate from and surrounding the heat exchanger;
monitoring an air pressure downstream from the bypass pre-cooler with a pressure sensor; and
using a processor to control a sleeve valve of the bypass pre-cooler based on the monitored air pressure downstream of the bypass pre-cooler to duct the bleed air through the heat exchanger or an annular inlet section of the bypass section; the annular inlet section of the bypass section formed between an outer surface of the sleeve valve and the housing.

9. The method of claim 8, further comprising diffusing the bleed air at an inlet of the bypass pre-cooler.

10. The method of claim 8, wherein the valve of the bypass pre-cooler comprises a sleeve valve and the heat exchanger comprises a plate fin air heat exchanger.

11. The method of claim 8, wherein the bypass pre-cooler further comprises a pipe manifold forming the bypass section.

12. The method of claim 8, further comprising delaying switching over to the high pressure stage from the low pressure stage, wherein the delaying comprises bypassing the heat exchanger.

13. An aircraft engine comprising:
a first duct extending from a low pressure section of a core engine flow;
a second duct extending from a high pressure section of the core engine flow;
a bypass pre-cooler within a housing, having a heat exchanger, a bypass section separate from and surrounding the heat exchanger, and an inlet coupled to the first and second ducts, the bypass pre-cooler having a sleeve valve coupled to the inlet; the sleeve valve having an outer surface forming with the housing an annular inlet section of the bypass section, and configured to switchably couple the inlet to the heat exchanger and the bypass section within the bypass pre-cooler via circumferentially spaced ports;
at least one processor;
a pressure sensor coupled to the at least one processor, wherein the pressure sensor monitors an air pressure downstream from the bypass pre-cooler; and
an actuator coupled to the at least one processor and the sleeve valve to control opening and closing of the sleeve valve, wherein the at least one processor controls opening and closing of the sleeve valve based on the air pressure downstream of the bypass pre-cooler as monitored by the pressure sensor.

14. The aircraft engine of claim 13, wherein the inlet comprises a diffusion section.

15. The aircraft engine of claim 13, wherein the bypass pre-cooler further comprises a double wall structure within a housing forming the bypass section.

16. The aircraft engine of claim 13, wherein the bypass pre-cooler further comprises a pipe manifold forming the bypass section.

17. The aircraft engine of claim 13, wherein the heat exchanger comprises a plate fin air heat exchanger.

18. The aircraft engine of claim 13, wherein the at least one processor delays switching over to a high pressure from a low pressure stage by controlling the actuator to bypass the core engine flow around the heat exchanger.

* * * * *